United States

Harvey 4,065,778

Dec. 27, 1977

[54] AUTOMATIC RANGEFINDER AND FOCUSING APPARATUS

[75] Inventor: Donald Malcolm Harvey, Webster, N.Y.

[73] Assignee: Eastman Kodak Company, Rochester, N.Y.

[21] Appl. No.: 696,958

[22] Filed: June 17, 1976

[51] Int. Cl.² ............................................... G03B 7/10
[52] U.S. Cl. ......................................................... 354/25
[58] Field of Search ........................... 354/25; 352/140; 250/578, 234; 356/1, 4

[56] References Cited

U.S. PATENT DOCUMENTS

| Re. 27,461 | 8/1972 | Harvey ................................... 354/25 |
| 3,442,193 | 5/1969 | Pagel ........................................ 354/25 |
| 3,723,003 | 3/1973 | Vockenhuber ...................... 352/140 |

*Primary Examiner*—John Gonzales
*Assistant Examiner*—M. L. Gellner
*Attorney, Agent, or Firm*—A. B. Pagel

[57] ABSTRACT

An automatic rangefinder and focusing apparatus is provided for use with a camera for determining the distance from an object to be photographed to the film plane of the camera and for positioning the camera's objective lens to focus an image of the object in the film plane. The apparatus comprises a photoresponsive device and a light emitter device that projects light in angularly intersecting relation to the optical axis along which light is received by a photodetector incorporated in the photoresponsive device. The light projected by the light emitter device is amplitude modulated at a frequency functionally related to the distance from the camera at which that light intersects the optical axis of the photoresponsive device. The emitted light reflected from an object located along that axis and received by the photoresponsive device produces a correspondingly modulated electric output signal that is translated into a readout of the object distance and/or into a corresponding focusing adjustment of the camera's objective lens. In a preferred embodiment, the rangefinder utilizes a plurality of light beams, each having a separate modulation frequency, which intercept three distance zones along the photodetector axis to form a zone type rangefinder and focusing apparatus. In another embodiment, two differently modulated light beams are emitted in partially overlapping relation to each other to define three distance zones. In still another embodiment, the emitter comprises movable means whereby a single light beam is swept through an angular path intersecting the photodetector axis as the modulation frequency of the beam is correspondingly changed.

6 Claims, 4 Drawing Figures

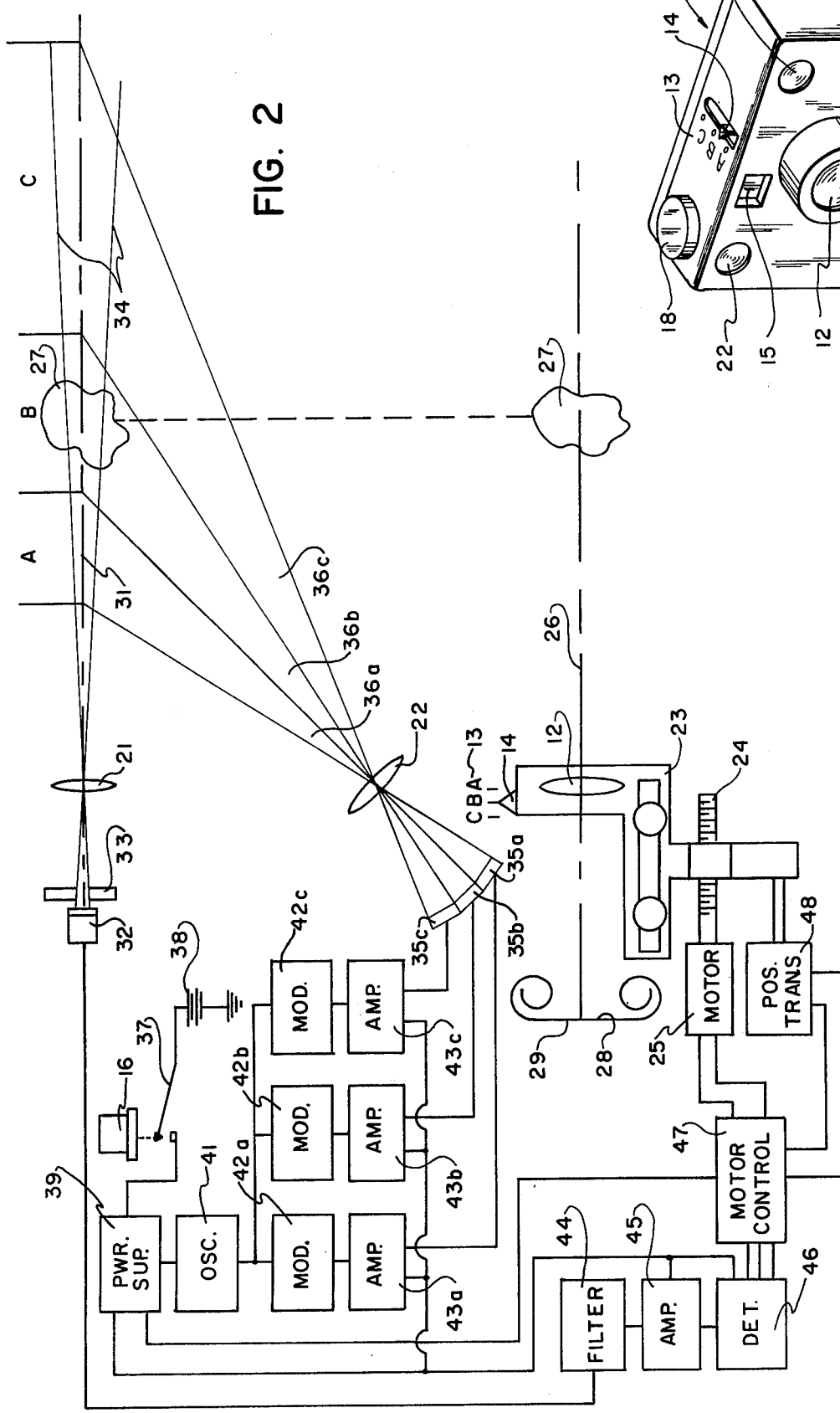

AUTOMATIC RANGEFINDER AND FOCUSING APPARATUS

BACKGROUND OF THE INVENTION

1. Field of the Invention

The present invention relates to automatic rangefinder and focusing apparatus for use in cameras. The apparatus illuminates an object to be photographed with light that is modulated at a frequency that is functionally related to the distance from the object to the camera. A photoresponsive device receives light reflected from the object and analyzes its modulation frequency to derive a readout of the object distance and/or to focus the camera's objective lens.

2. Description of the Prior Art

Automatic camera rangefinder and focusing devices known in the prior art can be categorized broadly as either passive or active devices, the former being those which derive object distance information from ambient light reflected from the object to be photographed and the latter being those in which distance information is derived from light originating at the camera and reflected back to the camera by the object. The present invention relates to automatic rangefinder and focusing devices of the active type and, more particularly, to that type of device in which the object distance is determined by triangulation principles as a function of the angle between the axis of the path of light emitted from the camera and impinging on the object and the axis of the path along which such light is reflected back to a photodetector incorporated in the camera.

Automatic camera rangefinder and focusing devices of the above described triangulation type can also be classified into two general species, namely those employing multiple light sources or multiple photodetectors to sense the presence of an object within different distance zones and those in which the optical axis of a single photodetector or light source sweeps angularly through the complete distance zone within which the device is intended to function. The present invention relates to both of these species, typical examples of which are disclosed in U.S. Pat. No. RE. 27,461 entitled Automatic Focusing For Cameras and assigned to the same assignee as the present invention. In the zone type of device, the plural light emitters or plural photodetectors are operated sequentially to identify the distance zone within which the object is located. In a variation of this type of device, two adjacent optical paths of the light emitters or photodetectors define respective zones and can overlap to define a third zone. The scanning type of device employs a movable element to cause a sweeping motion of the emitted light beam or of the field of view of the photodetector, and determines the object distance as a function of the instantaneous angular position of that movable element when the reflected light from the object is received by the photodetector.

To minimize the possibility of spurious photodetector energization caused by ambient light, it is known in both the zone and sweep species of automatic triangulation type rangefinder and focusing devices to employ light sources of specific spectral or modulation frequency characteristics which are unusual in normal ambient light whereby correspondingly selective photoresponsive devices can distinguish the light emitted from the camera from light originating from other sources.

SUMMARY OF THE INVENTION

In accordance with the present invention, a triangulation type of automatic rangefinding and focusing apparatus comprises a photoresponsive device and a light emitter device that projects light in angularly intersecting relation to the optical axis of a photodetector incorporated in the photoresponsive device. The light projected by the light emitter device is amplitude modulated at a frequency that is functionally related to the distance from the camera at which that light intersects the optical axis of the photodetector, whereby an object within the field of view of the photodetector will be illuminated with light having a modulation frequency functionally related to its distance from the camera. The emitted light reflected from the object and received by the photoresponsive device produces a correspondingly modulated electric output signal that is translated into a readout of the object distance and/or into a corresponding focusing adjustment of the camera's objective lens. In a preferred embodiment, the rangefinder utilizes a plurality of light beams, each having a separated modulation frequency, which intercept three distance zones along the photodetector axis to form a zone type rangefinder and focusing apparatus. In another embodiment, two separately modulated light beams are emitted in partially overlapping relation to each other to define three distance zones. In still another embodiment, the emitter comprises movable means whereby a single light beam is swept through an angular path intersecting the photodetector axis as the frequency modulation of the beam is correspondingly changed.

The invention and its objects and advantages will become more apparent in the detailed description of the preferred embodiments presented below.

BRIEF DESCRIPTION OF THE DRAWINGS

In the detailed description of preferred embodiments of the invention presented below, reference is made to the accompanying drawings in which like reference characters denote like elements and in which:

FIG. 1 is a pictorial view of a photographic camera provided with an automatic rangefinding and focusing apparatus in accordance with the invention.

FIG. 2 is a schematic diagram, partially in block form, showing an automatic zone type rangefinding and focusing apparatus in accordance with one illustrative preferred embodiment of the invention;

DESCRIPTION OF THE ILLUSTRATIVE PREFERRED EMBODIMENTS

Figure 3:
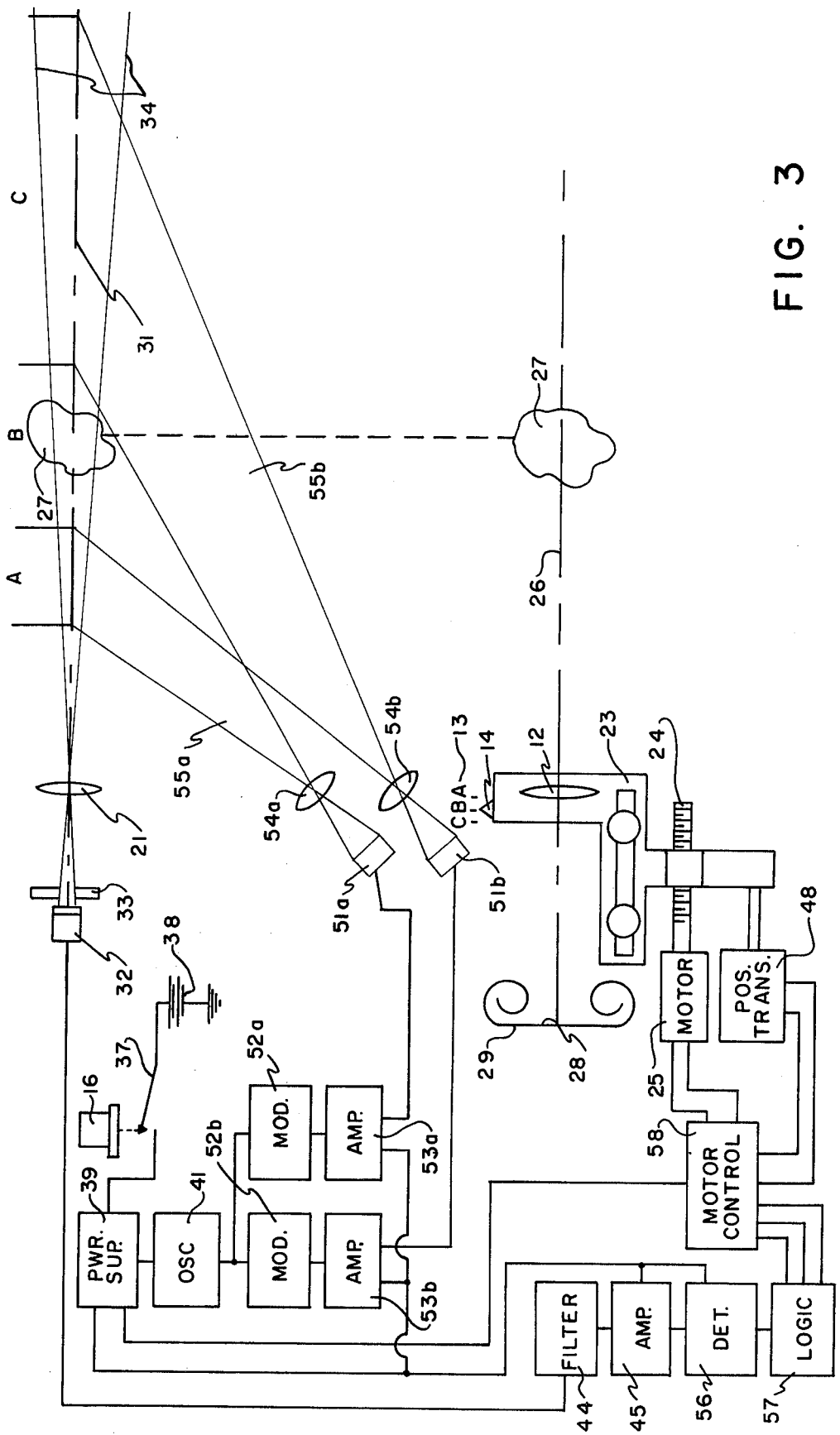
FIG. 3 is a schematic diagram, partially in block form, showing an automatic zone type rangefinding and focusing apparatus in accordance with a second illustrative preferred embodiment of the invention.

Because photographic cameras are well known, the present description will be directed in particular to elements forming part of, or cooperating more directly with, the present invention, camera elements not specifically shown or described herein being understood to be selectable from those known in the prior art.

FIG. 1 shows a camera 11 including an automatic rangefinding and focusing apparatus of the type illustrated in detail in FIG. 2. The camera is provided with an objective lens 12 which is movable along a predetermined path to focus a photographic image in a primary image plane. Additionally, camera 11 includes a range indicating scale 13 and its pointer 14, a viewfinder 15, a rangefinding and focusing actuator button 16, a shutter release button 17 and a film winding knob 18. Lenses 21 and 22 are associated with the automatic focusing and rangefinding apparatus incorporated in the camera and will be described below in greater detail. Similar camera constructions would be appropriate for use with the embodiments of the invention shown in FIGS. 3 and 4.

The automatic rangefinding and focusing apparatus illustrated in FIG. 2 includes the camera's objective lens 12, which is shown supported by slide member 23. The slide member, in turn, is adapted to be moved by the threaded armature shaft 24 of reversible motor 25. By this arrangement, the motor can adjust lens 12 along its optical axis 26 to focus an image of an object 27 in a primary focal plane 28 coincident with the exposure area of the photographic film represented at numeral 29.

The photodetector lens 21 is mounted with its optical axis 31 substantially parallel to the axis 26 of objective lens 12 and is adapted to focus light on the photosensitive face of a photodetector 32. Aperture plate 33 limits the effective area of the photodetector, whereby the latter has a relatively narrow field of view represented by boundary lines 34. For illustrative purposes the same object 27 is shown in two positions, namely, along objective lens axis 26 and also along the axis of photodetector lens 21, but it will be understood that the object would actually be much larger in proportion to the camera and would intercept both lens axes at substantially the same distance from the camera.

Emitter lens 22 is mounted in front of three light sources or light emitter units 35a, 35b, and 35c. Lens 22 is adapted to focus light from those units into three corresponding adjacent light beams 36a, 36b, and 36c, that intersect the field of view of the photodetector. The three light sources are preferably light emitting diodes (LEDs). Although shown as separate units, these LEDs might take the form of three adjacent light emitter regions on a single integrated circuit board, which could also include various elements of the electronic circuitry described below. It should be understood that the light sources may emit infrared or ultraviolet light and that the term "light" as used herein includes those types of radiation beyond the normal visible range of the electromagnetic radiation spectrum.

A normally open switch 37, operated by actuator button 16, connects a battery 38 to a power supply unit 39. When the switch is closed, the power supply unit energizes an oscillator 41 to produce an amplitude modulated carrier signal of a fixed audio or radio frequency that is selected to be within the response time range of the photodetector and the electronic circuitry with which it is associated and to be distinguishable from primary or harmonic frequency characteristics of the intensity variations that commonly occur in ambient light. For example, the carrier frequency would be selected to be distinguishable from a 60 cycle frequency or harmonics thereof because of the 60 cycle modulation of light originating from fluorescent light units. The term amplitude modulation will be understood to include both continuous moudulation, e.g. sine wave modulation and pulsed or chopped modulation, e.g. square wave modulation. Alternatively, as previously mentioned, the spectral quality of the light could be limited to a specific narrow wavelength for this purpose of distinguishing it from ambient light.

Three separate frequency modulator units 42a, 42b, and 42c receive the carrier signal from oscillator 41 and superimpose mutually distinguishable lower frequency amplitude modulation codings on that signal. The mutually distinguishable frequency coded output signals of the three modulator units are supplied to the corresponding amplifier units 43a, 43b, and 43c, the amplified outputs of which energize the respective light sources 35a, 35b, and 35c. Therefore, when an object 27 is located along the axis of the photodetector within any of the three zones A, B or C, its zonal position will be characterized by the coding of the illumination that it receives from the corresponding light source; and the reflectance of a portion of that illumination to the photodetector causes the latter to produce an electrical output signal characterized by the same coding.

The output signal from the photodetector is delivered to a filter 44 that is tuned to a frequency range corresponding to that of oscillator 41 to isolate those components of the photodetector output that are produced by the rangefinding illumination of the object. Alternatively, an optical filter or a narrow band photodetector could be employed for the same purpose if the light from the light source is distinguished from ambient light by a spectral property such as a specific wavelength, rather than by a superimposed carrier frequency modulation. The output of filter 44 is amplified by an amplifier unit 45 and fed to detector circuit 46, which identifies the zonal range coding and provides a corresponding input to a motor control circuit 47. Under the influence of position feedback transducer 48, which monitors the position of the lens supporting slide member 23, the control circuit energizes the reversible motor 25 to position the lens at a focal position corresponding to the appropriate zone. Pointer 14 indicates the zonal position of the lens on scale 13 to indicate the object distance to the operator.

In addition to the three zones A, B and C, the control circuit can also be adapted to adjust the objective lens automatically to its hyperfocal distance if the rangefinder and focusing apparatus fails to detect an object within its operative range. Such failure might indicate either that the object to be photographed is closer to the camera than zone A or farther from the camera than zone C, but the latter possibility is much more likely and the control circuit would preferably be designed accordingly.

Because the automatic rangefinder and focusing apparatus embodiment shown in FIG. 3 is a modification of the embodiment just described, the elements that are common to both embodiments are identified by the same reference characters and need not be explained again.

In accordance with this embodiment of the invention, only two light sources 51a and 51b are employed in cooperation with respective modulators 52a and 52b and amplifiers 53a and 53b. As previously explained, these modulator and amplifier units cause the light emitted from the two light sources to include mutually distinguishable distance coding modulation characteristics superimposed on the higher frequency light source identification characteristics common to both light sources. The two light sources 51a and 51b are provided with respective beam defining lenses 54a and 54b, which are located such that the light beam 55a from light source 51a illuminates both zones A and B and the corresponding light beam 55b from light source 51b illuminates both zones B and C. The electrical output of amplifier 45 is therefore modulated with the distance coding modulation of light source 51a if the object is in zone A; with the combined distance coding modulations of both light sources if the object is in zone B; and with the distance coding modulation of only light source 52b if the object is in zone C. Detector 56 is adapted to detect either or both of the two different distance coding modulations and to provide corresponding signals to a logic unit 57, which translates those signals into an output that is characteristic of the particular zone in which the object is located. This output regulates motor control unit 58, which causes motor 25 to position the objective lens 12 accordingly in the manner previously described.

Figure 4:
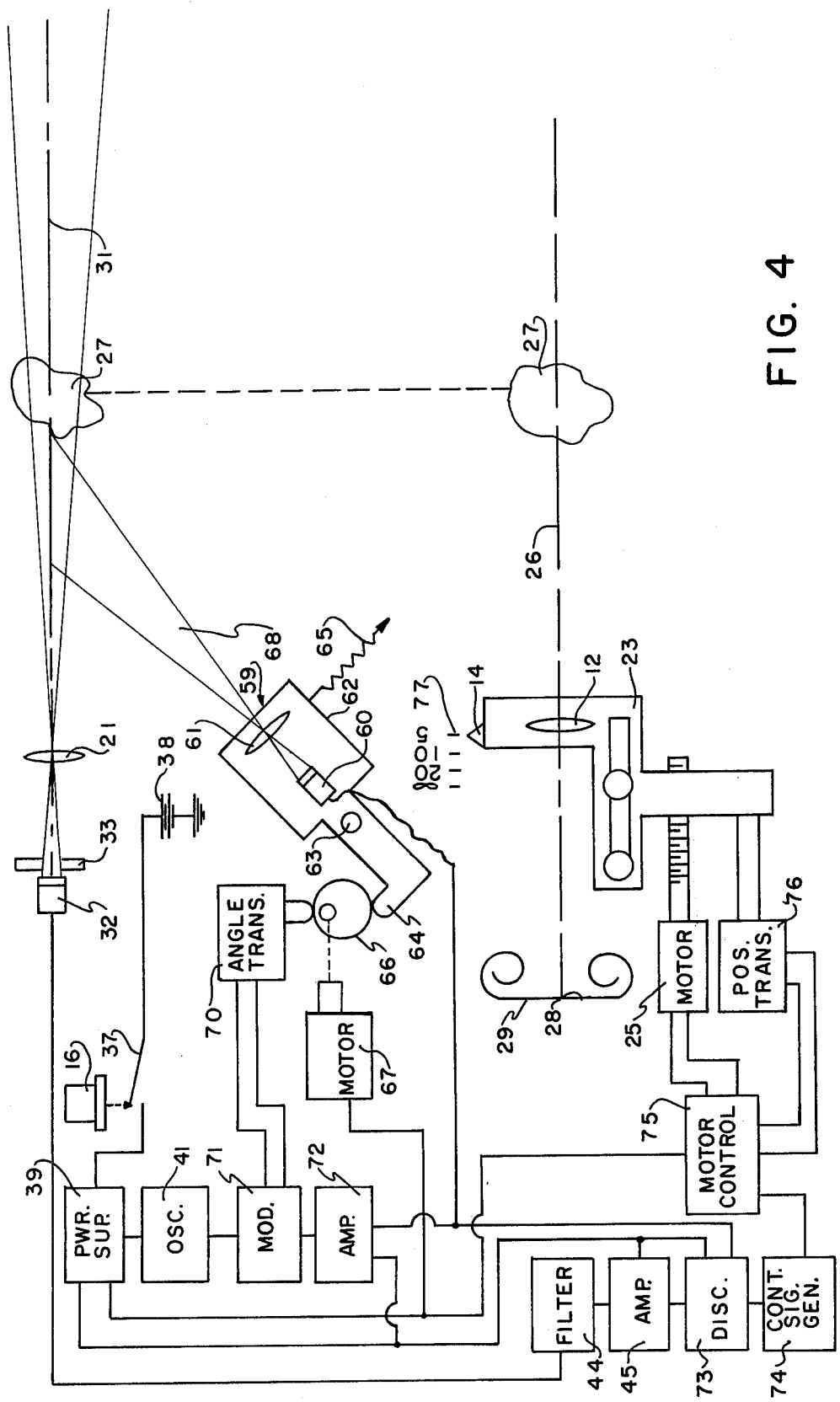
FIG. 4 is a schematic diagram, partially in block form, showing an automatic sweep type rangefinding and focusing apparatus according to a third illustrative embodiment of the invention.

The embodiment of the invention illustrated in FIG. 4 likewise employs various components similar to those incorporated in the embodiments shown in FIGS. 1-3, which are identified by the same reference numerals and which need not be further described.

This embodiment employs only a single light emitter unit 59, comprising a light source 60 and a beam defining lens 61, which are carried by a support plate 62 reciprocably rotatable about a pivot pin 63. A cam follower projection 64 on support plate 62 is urged by spring 65 into contact with the periphery of cam 66 mounted to the shaft of motor 67. When switch 37 is closed by push button 16, motor 67 rotates cam 66 and thereby reciprocates the light emitter unit so that its emitted light beam 68 sweeps back and forth along the optical axis 31 of the photodetector. In its illustrated position, the light emitter unit projects its light beam along a path that intersects the optical axis of the photodetector at the closest point to the camera at which the rangefinder is designed to function and when the schematically depicted cam has rotated 180° the light beam intersects the photodetector axis at the farthest distance from the camera within the range of the rangefinding apparatus.

An angle transducer device 70, engaged with cam 66, monitors the angular position of the light emitter unit and causes a frequency modulating circuit 71 to superimpose on the carrier frequency established by oscillator 41 a modulation characteristic functionally related in its frequency to the angular position of the light emitter unit. The output of circuit 71 is amplified by amplifier 72 and energizes the LED light source 60. Because the angular position of the light emitter unit determines the distance from the camera at which the emitted light beam intersects the photodetector axis, the frequency component of the photodetector output attributable to the angular position of the light emitter unit can be decoded to determine the distance of the object from the camera. This is accomplished by means of a discriminator circuit 73 that receives the filtered and amplified output of the photodetector from amplifier 45 and provides a distance indicating output signal to the control signal generator circuit 74. The output of the control signal generator circuit is delivered to the motor control circuit 75, which receives lens position information from transducer 76 and controls motor 25 to position the objective lens in accordance with the measured object distance. In this embodiment, the adjustment of the lens is continuous as opposed to the zone type adjustment described in connection with FIGS. 1-3, and the measured object distance is displayed on a distance scale 77 similar to scale 13.

The specific manner in which the distance coded output of amplifier 45 is processed by discriminator circuit 73 and/or control signal generator circuit 74 will vary according to the type of camera in which the rangefinder device is incorporated and its intended mode of operation. In its simplest still camera form, the rangefinder will include means whereby motor 67 can be controlled to cause the light emitter unit to scan from the near distance to the far distance only once in response to each depression of button 16. In this type of construction, the field of view of the photodetector is quite narrow and the object to be photographed will presumably fill the field of view. Accordingly, the photodetector will receive only a single pulse of light originated by the light emitter unit and coded according to the distance to the object, and the objective lens will be adjusted accordingly.

If the object does not quite fill the field of view of the photodetector, the latter may also receive light reflected from more distant surfaces behind the object, but this phenomenon can be prevented from causing faulty adjustments of the objective lens simply by designing the discriminator circuit or motor control signal generator circuit to respond to the strongest coded distant signal received from the photodetector. If the photodetector is adapted to scan continuously, the circuitry associated with controlling the objective lens adjusting motor can be designed to respond to the nearest coded light signal received by the photodetector just prior to the release of button 16.

The release of the rangefinder button can also be adapted to initiate the operation of the camera shutter, but in still picture photography it is preferable that the rangefinder and the shutter be operable independently so that the photographer can adjust the lens automatically according to the distance to the primary object in the scene and then can move the camera to locate that object at any point within the objective lens field. In a motion picture camera, on the other hand, the field of view of the photodetector preferably will be approximately equal to the field of view of the objective lens and the rangefinder device will continuously refocus the objective lens with respect to the nearest object detected within that field of view. In this case, the discriminator and/or control signal generator circuits must be more elaborate to adjust the lens in response only to the coded light reflected from the closest object in the field of view, even though more distant objects may be even more highly reflective than the closest object. Furthermore, means will also be included in one or both of those circuits for averaging sequentially received focusing signals to achieve smooth and gradual refocusing of the objective lens rather than erratic excursions of the lens as the camera is scanned across a scene in which the closest objects vary substantially in distance from the camera. Additionally, the electronic circuitry and/or the mechanical lens adjusting elements may include means whereby the focusing adjustment of the objective lens takes into account an optimum depth of field criterion functionally related to the size of the lens aperture.

These various circuitry modifications would also be applicable to similar continuous scanning type rangefinders in which the emitted light is modulated only with a carrier frequency and in which the object distance determination is derived directly from the angle of the light emitting unit at the instant the reflective light is sensed by the photodetector. Because appropriate circuitry and mechanisms for accomplishing these various functions wil be apparent to persons skilled in the camera or electronic arts, specific details thereof have been omitted for purposes of the present disclosure.

The invention has been described with particular reference to preferred illustrative embodiments thereof, but it will be understood that variations and modifications can be effected within the spirit and scope of the invention.

I claim:

1. An automatic rangefinding device for use in a photographic camera having an objective lens that is adjustable to different focal positions, said device comprising:
   a. path defining means defining a predetermined light reception path along which light is transmitted to said rangefinding device,
   b. light emitting means spaced from said reception path and adapted to emit light in angular intersecting relation to said reception path to illuminate an object located along a predetermined portion of said reception path, whereby a portion of the light emitted by said light emitting means and iluminating said object is reflected by said object along said reception path,
   c. light source characterizing means for providing the light emitted by said light emitting means with a first predetermined characteristic selected to distinguish that light from light originating from other sources,
   d. interception location characterizing means for providing the light emitted by said light emitting means with a second characteristic distinguishable from said first characteristic and functionally related to the location along said portion of said reception path at which such light intercepts said path,
   e. photoresponsive means for receiving light transmitted along said reception path, said photoresponsive means being adapted to respond only to light having said first predetermined characteristic to produce an electrical output corresponding to said second characteristic when said photoresponsive means receives light having both of said characteristics,
   f. lens focusing means for automatically adjusting the focal position of said objective lens as a function of said electrical output.

2. A device according to claim 1 in which said light emitting means comprises a plurality of light sources adapted to emit respective light beams that intersect corresponding predetermined adjacent regions along said light reception path to define corresponding focus zones, said light beams having the same first predetermined characteristic but having mutually distinguishable second characteristics whereby the electrical output of said photoresponsive means characterizes the particular focal zone occupied by an object illuminated by said light emitting means.

3. A device according to claim 1 in which said light emitting means comprises first and second light sources adapted to emit respective first and second light beams that partially overlap each other along said light reception path to define a first focus zone illuminated by said first light beam, a second focus zone illuminated by both said first and second light beams and a third focus zone illuminated by said second light beam, said first and second light beams having the same first predetermined characteristic but having respective mutually distinguishable second characteristics, whereby said photoresponsive means produces an electrical output that corresponds to the second characteristic of said first light beam when an object is located in said first focus zone, to the combined second characteristics of both said first and second light beams when an object is located in said second focus zone and to the second characteristic of said second light beam when an object is located in said third focus zone.

4. A device according to claim 1 in which said light emitting means produces a single light beam that moves angularly with respect to said light reception path, whereby the intersection of said light beam and said light reception path moves along a predetermined region of said light reception path, said interception location characterizing means being adapter to alter said second characteristic of said light beam to characterize the distance from said camera at which said light beam intersects said light reception path.

5. A device according to claim 1 in which said first predetermined characteristic of said light emitted by said light emitting means is in the form of a constant frequency amplitude modulation having a frequency within the audio and radio portion of the frequency spectrum.

6. A device according to claim 1 in which said second characteristic of said light emitted by said light emitting means is in the form of an amplitude modulation having a frequency within the audio and radio portion of the frequency spectrum and functionally related to the location along said portion of said reception path at which such light intercepts said path.

* * * * *